Oct. 16, 1962 J. W. RICHARDSON, JR 3,058,201
METHOD OF MANUFACTURE OF TRANSFORMER CORES
Filed Sept. 8, 1958 4 Sheets-Sheet 1
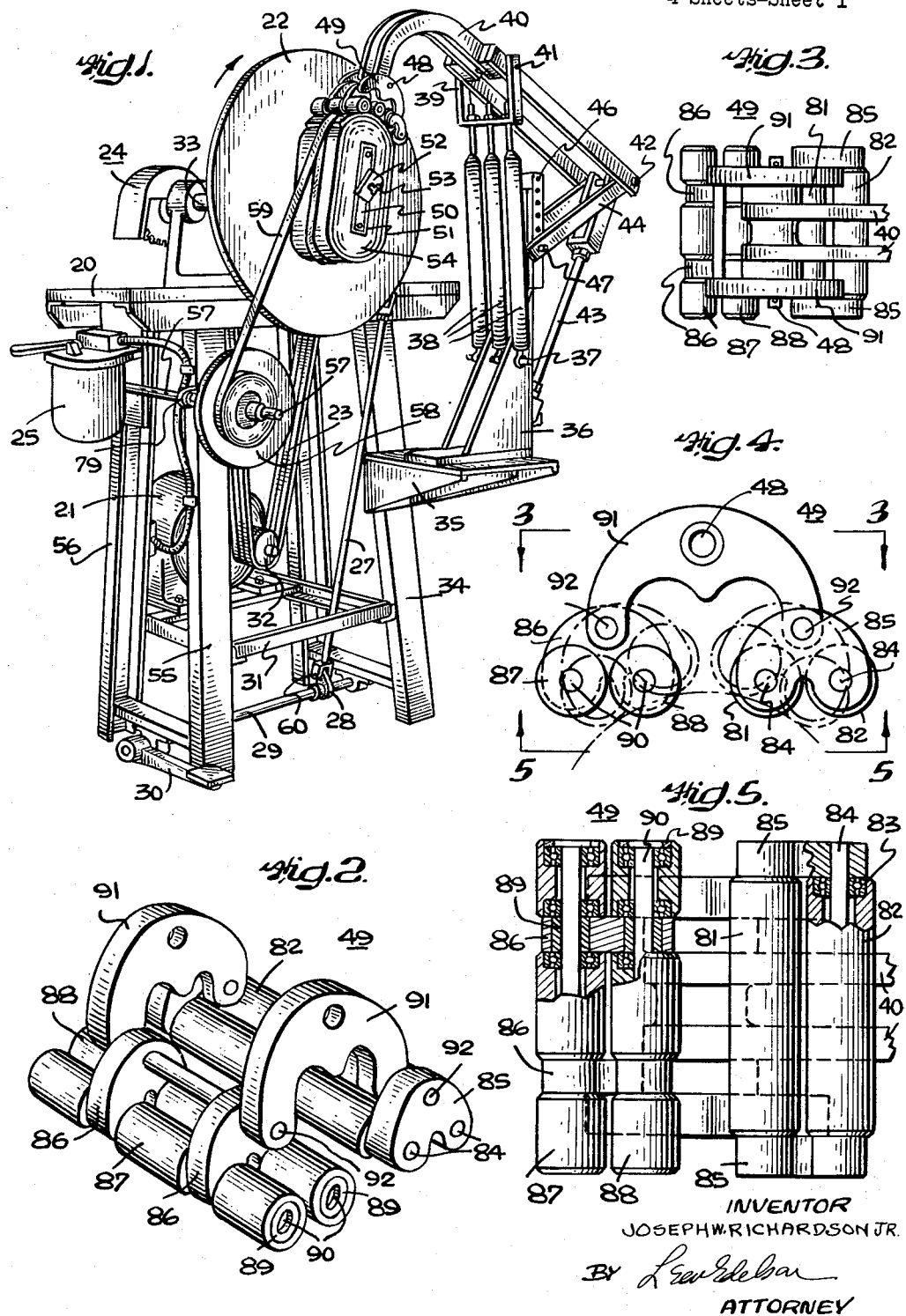
INVENTOR
JOSEPH W. RICHARDSON JR.
BY
ATTORNEY

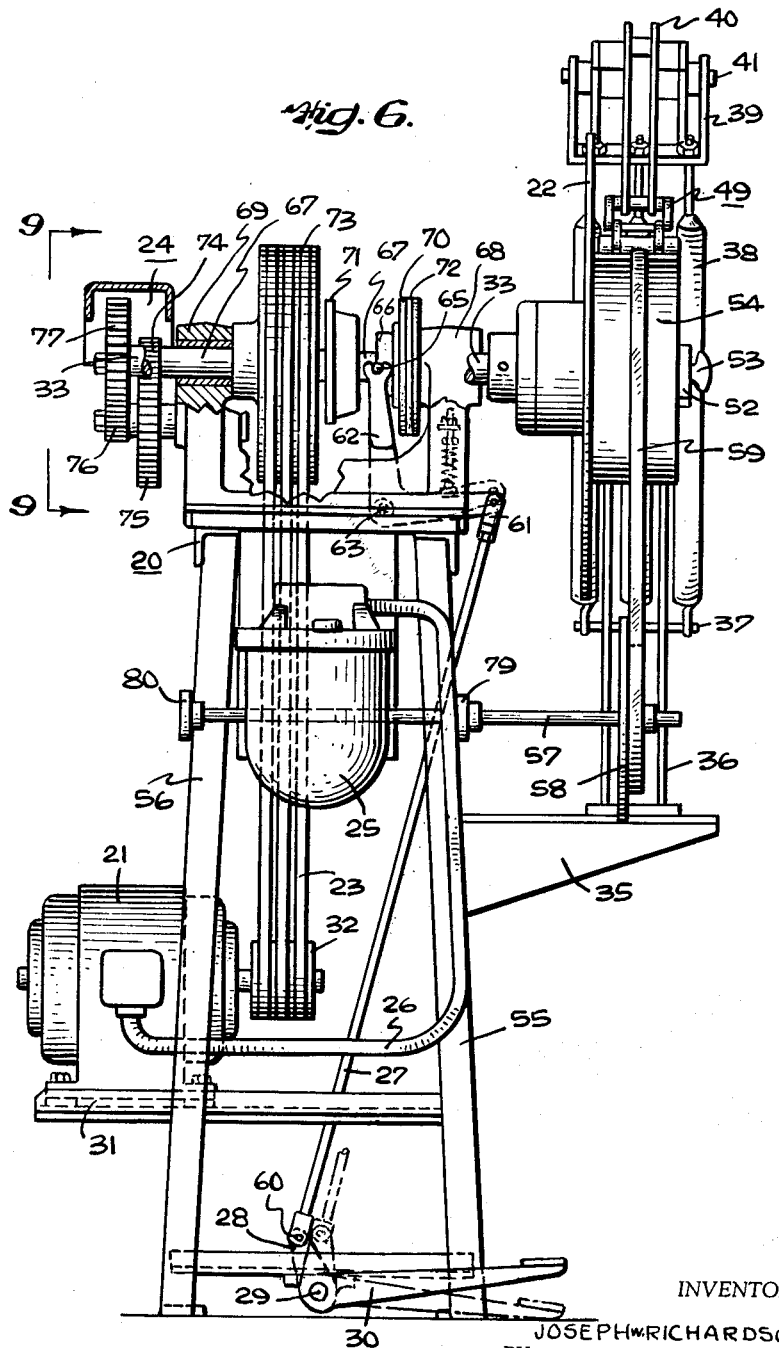

Oct. 16, 1962  J. W. RICHARDSON, JR  3,058,201
METHOD OF MANUFACTURE OF TRANSFORMER CORES
Filed Sept. 8, 1958  4 Sheets-Sheet 3

INVENTOR.
JOSEPH W. RICHARDSON JR.
BY
ATTORNEY

Oct. 16, 1962  J. W. RICHARDSON, JR  3,058,201
METHOD OF MANUFACTURE OF TRANSFORMER CORES
Filed Sept. 8, 1958  4 Sheets-Sheet 4
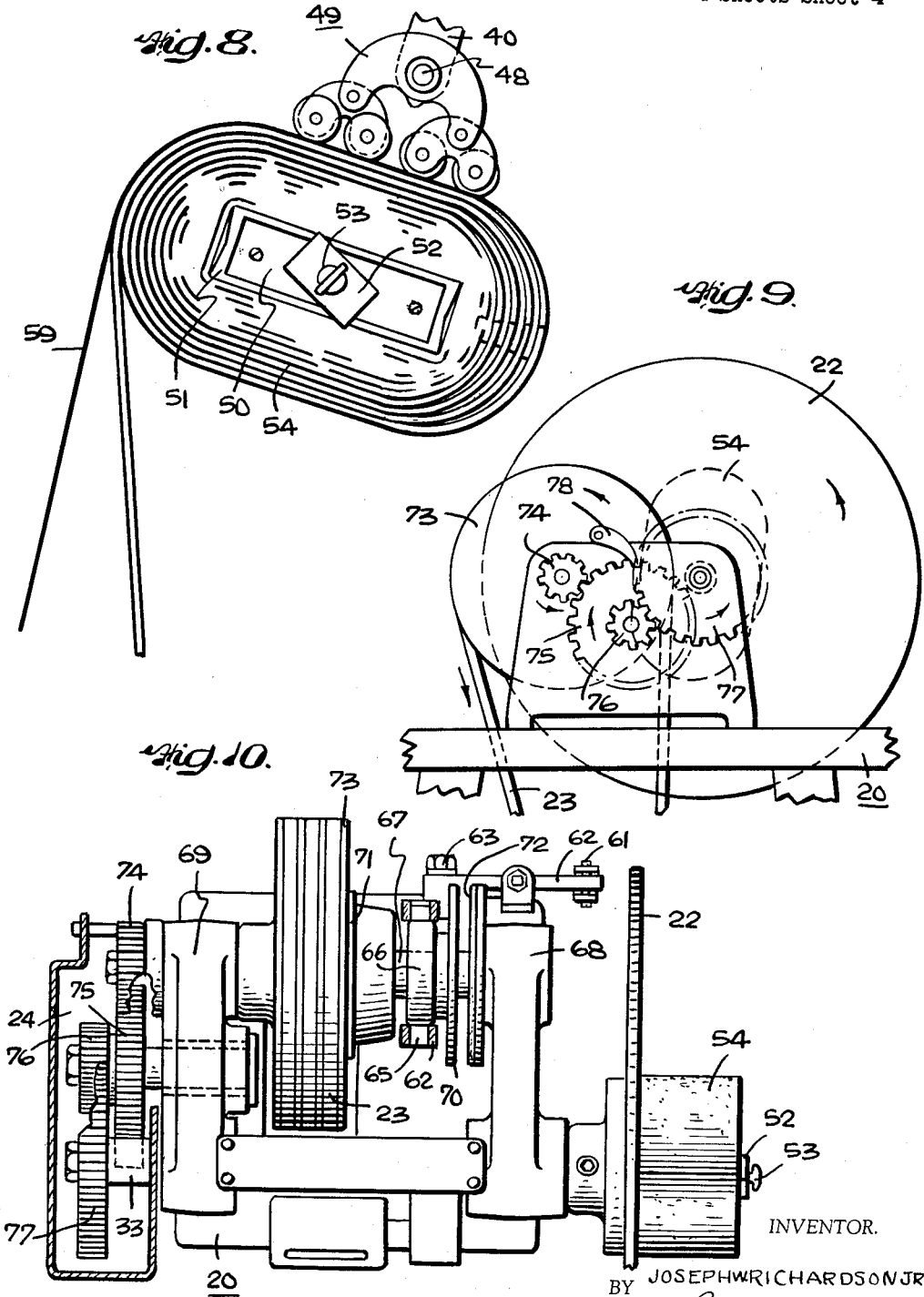
INVENTOR.
JOSEPH W. RICHARDSON JR.
BY Leon Edelson
ATTORNEY

United States Patent Office 3,058,201
Patented Oct. 16, 1962

3,058,201
METHOD OF MANUFACTURE OF TRANSFORMER CORES
Joseph William Richardson, Jr., Horsham, Pa., assignor, by mesne assignments, to H. K. Porter Company, Inc., Pittsburgh, Pa., a corporation of Delaware
Filed Sept. 8, 1958, Ser. No. 759,521
7 Claims. (Cl. 29—155.57)

This invention relates to wound electrical transformer cores, and more particularly to the method of and apparatus for winding such cores.

Transformer cores of the wound type have been generally fabricated by first pre-winding such cores from a continuous strip of core material, then annealing the pre-wound core to provide a strain-free core, unwinding the annealed core and assembling the transformer by rewinding the core strip through the coil window. This method, although widely used, suffers from the fact that the unwinding of the annealed core and rewinding through the coil window cause new strain conditions to be set up in the core material due to the flexing of the core strip material during such operations, and thus, in some measure undoes the results of the annealing process. The fabrication of a core in the foregoing described manner is, moreover, relatively time consuming and therefore costly.

In order to alleviate these problems associated with continuous strip core transformers, the foregoing method was modified to a certain extent by cutting the core strip as it was unwound after annealing, such cuts being made once for each complete turn of the core winding. This procedure reduced the fabrication time of the finished transformer but introduced additional difficulties of two kinds. Firstly, the finished transformer core necessarily contained stacked butt-joints on one leg which introduced additional core losses. Secondly, the process of cutting the core strip after annealing introduced new strains in the core material, and so also tended to offset to some degree the benefits of annealing.

A variation of the above-described method is to prewind the core in the shape of an equilateral trapezoid, and after annealing to cut the core through the longer base. The cut ends of the longer base are then overlapped in the finished transformer core. In this way the butt-joint construction can be replaced by a lap-joint construction which improves the core losses. However, the strain conditions introduced due to cutting the core are still present. Moreover, the shape of the annealed core is changed from trapezoidal to rectangular after cutting and final assembly so that additional strains are set-up in the final transformer core.

Regardless of which of the foregoing described methods is used, all of the methods employ a spacer between successive turns of the pre-wound core prior to annealing. This is done so that the annealed unwound core may be reassembled in the finished transformer without distortion of the core shape. Without the spacer, successive turns of the core do not nest properly when reassembly is attempted. Up to now the spacer materials used have been made of paper, fabric or powder, and these materials have been found to break down when subjected to the annealing temperatures which are on the order of about 1500° F. This spacer material breakdown may take the form of charring or involve other changes all of which require that the core laminations, after annealing, be cleaned to remove this material. If this material is not cleaned away reassembly of the core is exceedingly difficult, if not impossible, and the core characteristics are seriously impaired. The cleaning process to which cores made by the previously described methods are necessarily subjected is again time consuming and costly. The wound transformer core according to my invention does not suffer from the foregoing described difficulties encountered with previously known methods of fabricating such cores and is therefore inherently capable of producing wound transformer cores of superior characteristics at lower cost. Accordingly, it is a primary object of my invention to provide a novel method of fabricating a wound transformer core in which the necessity for cleaning the core laminae after annealing is completely eliminated.

Another object of my invention is to provide a novel method of fabricating a wound transformer core in which the benefits of annealing are realized to a much greater degree than in other transformers by eliminating the operation of cutting the core after the annealing process.

Yet another object of my invention is to provide a novel method of fabricating a wound transformer core in which the shape of the core after final assembly is the same as that just after annealing so that the core is essentially unstrained.

These and other objects will appear clearly hereinafter when considered in conection with the following detailed description of my invention when read in conjunction with an examination of the several drawings, wherein:

FIGURE 1 is a perspective view of one possible apparatus for fabricating a wound transformer core according to my invention and which shows a transformer in the process of being wound.

FIGURE 2 is a perspective view of a wound-core forming-roller which is part of the apparatus of FIGURE 1.

FIGURE 3 is a plan view of the forming-roller of FIGURE 2 taken along the lines 3—3 of FIGURE 4.

FIGURE 4 is a side elevational view of the forming-roller of FIGURE 2.

FIGURE 5 is a partially sectioned bottom view of the forming-roller of FIGURE 2 taken along the lines 5—5 of FIGURE 4.

FIGURE 6 is a partially sectioned side elevational view of the apparatus of FIGURE 1 with certain parts broken away to show otherwise obscured details.

FIGURE 8 is a fragmentary enlarged view of a partially wound core showing certain details of fabrication.

FIGURE 9 is a diagramatic showing of the driving gear arrangement of the apparatus of FIGURE 1.

FIGURE 10 is a fragmented plan view of the apparatus of FIGURE 1 illustrating certain constructional details of the power transmission.

Figure 7:
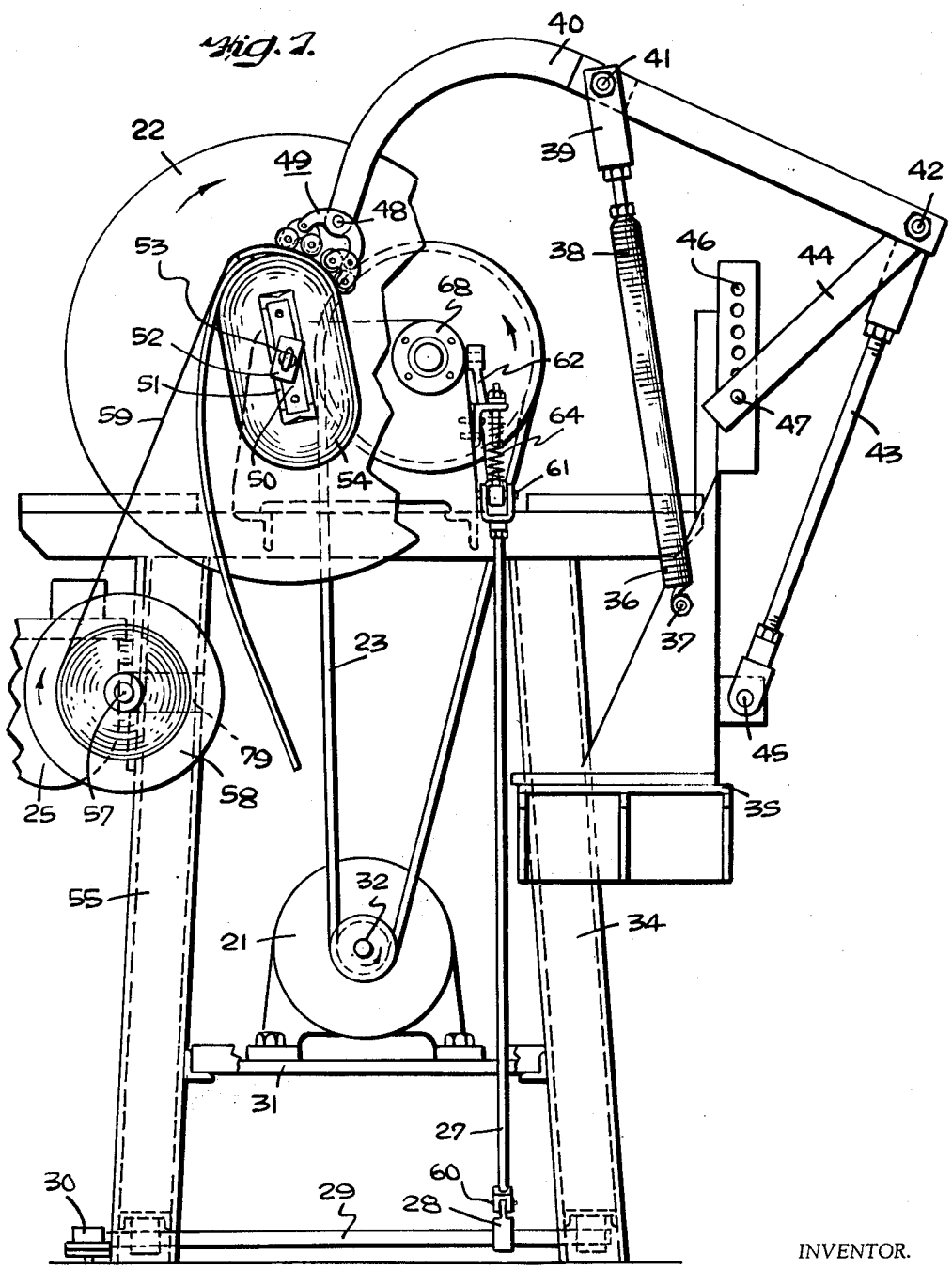
FIGURE 7 is a front elevational view of the apparatus of FIGURE 1 with certain parts broken away to reveal other details.

Before describing in detail the novel method of and apparatus for, fabricating wound transformer cores according to my invention, it will be an aid to understanding if the following brief general description is first considered. Instead of using a single strip of core material to form the pre-wound core, the core material is first pre-cut into strips. These strips may be cut to any convenient length, as for example strips of successively longer length wherein each strip corresponds to a single turn or to multiple turns of the core, or even to multiple fractional turns, or a mixture of lengths. The particular core illustrated in FIGURE 8 of the drawings, and which will be subsequently described in more detail, illustrates the use of successively longer single turn strips, although the practice of my invention is by no means so restricted.

Fastened to one side of a mandrel whose shape and dimensions correspond to the window of the coil through which the core will eventually be wound, is one end of a shim-steel tape. One end of the first core strip is inserted between the mandrel and the tape and the mandrel is rotated to wrap the strip there about, the steel tape overlying the strip and binding it closely about the mandrel. As the trailing end of the first core strip is reached, the leading end of the second core strip is inserted between the trailing end and the just wound portion of the first strip to form a lap-joint. The steel tape binds the leading end of the second strip in place under the trailing end of the first strip and the process continues with the addition of successive strips as the mandrel is rotated until the entire core is built up with the steel tape interleaved between successive core turns. The core is then annealed and unwrapped to remove the steel tape spacer, and the core strips are ready for assembly into a complete transformer.

It will be appreciated at this point that the use of the shim-steel spacer tape prevents the formation during annealing of inter-laminar deposits such as occur when spacer materials such as those previously mentioned are used. The necessity for cleaning the annealed core laminae is therefore eliminated. Furthermore, the use of pre-cut core strips disposes with the need for cutting the core after annealing, and so does not introduce new strains attributable to post-annealing core cutting. Moreover, the shape of the core strips is the same in the final transformer assembly as just after annealing so that post-annealing bending strains are substantially eliminated. As a consequence of the foregoing it should be now apparent that the wound core of a transformer fabricated according to my invention is substantially strain-free and has core characteristics very close to those of the core immediately after annealing.

Understanding at this point the general method of core fabrication according to my invention, turn now to an examination of the drawings for a detailed description of one form of apparatus by which the method may be readily practiced. Referring first to FIGURES 1 and 7, there is seen a frame or stand 20 having a shelf 31 to which is securely mounted a reversible electric motor 21. The motor 21, when energized from a source of electric energy through the switch 25 and the cable 26, causes the belts 23 coupled to the motor shaft by a pulley 32 to controllably drive a power transmission which is not visible in FIGURE 1. The power transmission in turn drives the rotatable vertical table 22 through a gear assembly 24 and a shaft 33.

Secured to a leg 34 of the stand 20 is a bracket 35 to which in turn is secured a bracket 36. Fastened to the upper end of the bracket 36 by a pin 37 are a set of springs 38 which are themselves secured at their upper ends to a yoke 39. Each arm of the yoke 39 is pivotally secured by a pin 41 to a rocker arm 40 which extends in opposite directions from the yoke pivotal axis. The rear end of the rocker arm 40 is pivotally secured by a pin 42 to one of the ends of each of two other arms 43 and 44. The free end of arm 43 is pivotally secured to the lower part of the bracket 36 by a pin 45, and the free end of arm 44 is adjustably pivotally engaged with the bracket 36 by a pin 47 extending through one of a series of holes 46 in the upper part of the bracket 36. To the fore end of the rocker arm 40 is pivotally secured by a pin 48 a forming-roller 49 whose structural details are shown in FIGURES 2 through 5.

Fastened to the rotating table 22 is a block 50 whose geometric center coincides with the rotation axis of the table 22 so that the block 50 rotates with the table when the latter is driven. Slipped over the block 50 is a mandrel 51 which fits closely around the block so that there is little tendency for the mandrel to shift relative to the block in a plane parallel to the surface of the table 22. Fitted over a stud (not visible) in the block 50 is a clamping plate 52 which clamps the mandrel 51 against the table 22 when a wingnut 53 threaded onto the stud is screwed down against it, thereby preventing the mandrel from shifting away from the table 22. Partially built up on the mandrel 51 is a core 54. Pressed firmly against the core 54 is the forming roller 49, and it is seen that this roller will remain so pressed through the action of the springs 38 and the arms 40, 43 and 44 regardless of which part of the core periphery underlies it at any given moment. The forming roller 49 is biased by the springs 38 to move downward on an arc of the circle whose center is at pin 42 and whose radius is equal to the distance between pins 42 and 48. Such downward movement is restricted by the core 54 so that the pressing action results. Although the radius of the circle just defined always remains constant, the center of the circle, and hence its periphery, may be shifted away from the center of the core 54 by pivotally securing the arm 44 through successively higher holes 46 in the bracket 36. This adjustment is provided so that cores of larger size may be accommodated.

Rotatably secured to the legs 55 and 56 of the stand 20 by a shaft 57 and bearing brackets 79 and 80 is a reel 58 upon which is wound a steel tape 59. Assume for the moment that the core 54 has not yet been started on the mandrel 51 and that the tape 59 is completely wound on its reel 58. The free end of the tape 59 is led off of the reel 58 and secured to one side of the mandrel 51, as for example with a piece of scotch tape. The table 22 is then rotated perhaps through one revolution so that the tape overlaps itself and thereby secures itself to the mandrel. One end of a pre-cut strip of core material is then inserted between the tape 59 and the mandrel 51 at the point where the tape tangentially leaves the mandrel surface and extends back to its supply reel 58. When now the table 22 is rotated in the direction shown in FIGURE 7, the core strip is wrapped about the mandrel 51, being conformed to the mandrel surface by the forming-roll 49 and bound tightly by the overlying tape 59 which unwraps from the reel 58. The next strip of core material is inserted as shown in FIGURE 7 and the process described is continued until the desired size core is achieved.

At this point, the steel tape is cut and the free end of the tape which is interleaved with the core strips is fastened down. A retainer clamp (not shown) is then secured about the finished core. The core with the mandrel is removed from the table 22 by releasing the wingnut 53 and clamping plate 52, and disengaging the forming-roller 49 from the core periphery. The core is then annealed and thereafter replaced on the table 22, but the forming-roller 49 is not re-engaged with the core periphery since the annealing process has eliminated the tendency of the core laminae to spring open. The outer end of the steel tape is unfastened and secured to the free end of the steel tape remaining on the reel 58, as for example by spot-welding. The electric motor 21 is then run in reverse so that the table 22 rotates counter to its direction during core winding. The core 54, of course, rotates with the table 22 so that the tape 59 may be rewound upon the reel 58 and the core laminae may be successively stripped from the core, beginning with the outermost lamination and progressing inward until the innermost lamination is removed from the mandrel 51.

The core laminae are now immediately ready for assembly into a complete transformer. The shim-steel tape 59, which may be approximately 2 mil thick cold-rolled steel, may be reused many times over since it is not affected by the annealing process.

Referring now to FIGURES 1, 6, 9 and 10 for an understanding of the mechanical details of the core winding apparatus, there will be seen a treadle 30 pivotally secured to the bottom of the stand 20 by a horizontal shaft 29. Keyed or otherwise fastened to the shaft 29 is a link 28 which is pivotally connected by a pin 60 to the lower end of a generally vertically extending shaft 27. The upper end of the shaft 27 is pivotally linked to one end of an angle arm 62 by a pin 61. The vertex of the angle arm 62 is pivotally secured to the stand 20 by a lug 63 so that the arm 62 may pivot about a horizontal axis when the shaft 27 moves vertically in response to actuation of the treadle 30.

As best seen in FIGURES 6 and 7 a compression spring 64 biases the angle arm 62 so that the vertical portion thereof is right-shifted and the horizontal portion is depressed. The spring 64, therefore, acting through the shaft 27 causes the treadle 30 to assume a normally up position as indicated in solid lines in FIGURE 7. When the machine operator depresses the treadle 30 by overcoming the spring bias, the shaft 27 moves upward and causes the vertical portion of the angle arm 62 to be left-shifted, at the same time placing the spring 64 in compression. When the operator removes his foot from the treadle, the compressed spring 64 expands and restores the treadle 30 to its up position. The up treadle position corresponds therefore to right-shifted position of the upper portion of angle arm 62, and the down treadle position corresponds to left-shifted position. As will be explained, left-shifted and right-shifted angle arm 62 positions result respectively in rotation and braking of the table 22, so that "down treadle" produces rotation and "up treadle" produces braking of the rotatable table 22.

As best seen in FIGURES 6 and 10, the vertical portion of the angle arm 62 terminates in a yoke which pivotally engages a pair of studs 65—65 on opposite sides of a collar 66. Rotatable within the collar 66 is a bearing (not visible) which is fixed to a shaft 67 for rotation therewith, the shaft 67 being journalled in end bearing 68 and sleeve bearing 69 fixedly secured to the stand 20. Also fixedly secured to the shaft 67 for rotation therewith are a brake disc 70 and a clutch disc 71. The rotatable brake disc 70 is adapted for frictional engagement with a fixed brake disc 72 which is secured to the housing of the bearing 68 when the arm 62 is in right-shifted position (up treadle). The rotatable clutch disc 71 is adapted for frictional engagement with a clutch surface on the face of the pulley 73 which presents toward the disc 71 when the arm 62 is in left-shifted position (down treadle). It is therefore clear that when the brake discs 70 and 72 are engaged, the shaft 67 will be braked to a stop and its rotation will cease. When however, the clutch disc 71 engages the pulley 73, the shaft 67 will rotate with the pulley. The pulley 73, which is continuously rotated by the motor 21 via the belts 23, is freely rotatably mounted about the shaft 67 so that the shaft does not rotate with the pulley unless the clutch is engaged.

The table 22 rotates with the shaft 33 which is driven by the shaft 67 through the gear assembly 24 when the shaft 67 is driven by the pulley 73 through the clutch. The transmission of power from shaft 67 to shaft 33 through the gear assembly 24 is best understood by referring to FIGURES 6, 9 and 10. A gear 74 fixed to the shaft 67 engages a large idler gear 75. Fixed upon the same shaft as the idler gear 75 and rotatable therewith is a small idler gear 76. This small idler gear 76 is in turn engaged with a larger gear 77 fixed upon the shaft 33. As shown, the rotational speed of shaft 33 is substantially reduced below the speed of shaft 67 by virtue of the step-down arrangement of gear assembly 24. Various speed ratios can be employed merely by changing the gear ratios. FIGURE 9 also shows a dog 78 which is employed to prevent backward rotation of the table 22 during core winding. When however the annealed core is replaced upon the table 22 for unwinding, the dog 78 is pivoted out of the way so that the gears may reversely rotate when the motor 21 is electrically reversed through the switch 25.

Returning now to an examination of FIGURES 2 through 5 which illustrate the novel forming-roller assembly 49, it is seen that the roller assembly includes a pair of individually pivotable double roller subassemblies. Rollers 81 and 82 are free to rotate on ball bearing assemblies 83 which are secured to a pair of arcuate end plates 85—85 by pins 84, whereas rollers 87 and 88 are free to rotate on ball bearing assemblies 89 secured to a similar pair of arcuate plates 86—86 by pins 90. The arcuate plates 85—85 and 86—86 are pivotally pinned to a further set of arcuate plates 91—91 by pins 92, and the plates 91—91 are in turn pivotally pinned to the arm 40 by the pin 48. In operation, the entire forming-roller assembly 49 pivots about the pin 48 while the individual double roller subassemblies pivot about the pins 92. It will be appreciated that this novel construction allows the rollers to conform closely to the core surface and provide a very effective ironing action to produce a tightly wound core. The shim-steel tape 59 is therefore required only to bind the core strips and is not required to form the strips, so that high tape tension is not necessary.

Although my invention has been described in connection with a particular apparatus for practicing the same, it will be understood, of course, that such description is for illustrative purposes only, and various changes and modifications may be made from time to time without departing from the general principles or real spirit thereof, and it is intended to claim the same broadly, as well as specifically, as indicated by the appended claims.

What is claimed as new and useful is:

1. The method of shaping the laminations of a wound transformer core from at least two strips of core material including the steps of positioning a first strip of core material between a core form and a metallic tape, wrapping the first strip of core material and the tape together around the core form so that the tape binds the strip to the form, and then inserting the leading edge of the second strip under the trailing edge of the first strip and wrapping the second strip in the same manner as the first strip.

2. The method of claim 1 wherein simultaneous with the steps of wrapping, pressure is applied to the core material to cause it to closely conform to the underlying surface about which it is being wrapped.

3. The method of shaping the laminations of a wound transformer core from a plurality of pre-cut strips of core material including the steps of, securing one end of a metallic tape to the periphery of a core form, inserting one end of a first pre-cut core strip between the core form and the tape, rotating the core form and simultaneously applying pressure to the core material to wrap the strip and overlying tape closely around the form so that the tape is interleaved with the strip and binds the latter to the underlying surface about which it is wrapped, stopping the rotation of the core form just prior to binding the trailing edge of the first strip under the tape, inserting the leading edge of a second strip of core material under the trailing edge of the first strip of core material and reinitiating core form rotation to wrap and bind the second strip about the first strip in the same manner that the first strip was wrapped and bound around the core form, repeating the foregoing sequence of core form stopping, new strip insertion, and core form rotation until the entire plurality of pre-cut strips of core material have been incorporated into the wound core.

4. The method of claim 3 wherein after the last core strip has been wound, the excess tape is severed and the free end of the interleaved tape is fastened to the wound core assembly, the core assembly is annealed to impart a permanent set to the shaped laminations and the core laminations are successively stripped off by unwinding the interleaved tape.

5. The method of shaping the laminations of a wound transformer core assembly from a plurality of strips of magnetic core material comprising the steps of, winding a first strip together with an overlying metallic tape about a supporting mandrel, winding successive strips about the preceding ones with the leading end of each successive core strip inserted under the trailing end of the preceding strip and clamped thereunder by the tape as the strip and tape are wound into the core with the tape interleaving the successive strips of core material and binding the same to the core, said tape acting as a spacer between the convolutions formed by the successively wound strips of magnetic core material.

6. The method according to claim 5 including the further steps of, securing the core assembly to prevent separation of the convolutions thereof, annealing the secured assembly to impart a permanent set to the shaped laminations, unsecuring the annealed assembly and unwinding the convolutions thereof to separate the several core strips and simultaneously remove therefrom the interleaved tape, and then rewinding said tape upon a reel for subsequent re-use in the formation of additional transformer core assemblies.

7. The method according to claim 6 including the further step of sequentially nesting the core strips as they are unwound after annealing into a relative arrangement for facilitating their assembly into a complete transformer structure having the annealed core strips sequentially wound through the transformer coil windows.

References Cited in the file of this patent

UNITED STATES PATENTS

| | | |
|---|---|---|
| 402,551 | Winn | Apr. 30, 1889 |
| 789,707 | Bellamy | May 16, 1905 |
| 1,817,884 | Vienneau | Aug. 4, 1931 |
| 1,825,782 | Duff | Oct. 6, 1931 |
| 1,857,215 | Ruder | May 10, 1932 |
| 2,305,650 | Vienneau | Dec. 22, 1942 |
| 2,409,384 | Peterson | Oct. 15, 1946 |
| 2,478,030 | Vienneau | Aug. 2, 1949 |
| 2,542,806 | Ford et al. | Feb. 20, 1951 |
| 2,543,089 | Zimsky | Feb. 27, 1951 |
| 2,595,332 | Chapman et al. | May 6, 1952 |
| 2,689,396 | Vienneau | Sept. 21, 1954 |
| 2,907,967 | Smith | Oct. 6, 1959 |
| 2,927,366 | Link | Mar. 8, 1960 |

FOREIGN PATENTS

| | | |
|---|---|---|
| 106,986 | Great Britain | June 14, 1917 |